(12) United States Patent
Shi et al.

(10) Patent No.: US 12,405,714 B2
(45) Date of Patent: Sep. 2, 2025

(54) TRAJECTORY PROCESSING METHOD AND APPARATUS

(71) Applicant: NORTHWEST INSTRUMENT INC., Dover, NJ (US)

(72) Inventors: Xin Shi, Shanghai (CN); David Xing, Dover, NJ (US); Yang Zhou, Shanghai (CN); Mingyu Zhang, Shanghai (CN)

(73) Assignee: NORTHWEST INSTRUMENT INC., Dover, NJ (US)

( * ) Notice: Subject to any disclaimer, the term of this patent is extended or adjusted under 35 U.S.C. 154(b) by 0 days.

(21) Appl. No.: 18/360,953

(22) Filed: Jul. 28, 2023

(65) Prior Publication Data

US 2025/0036270 A1 Jan. 30, 2025

(51) Int. Cl.
*G06F 3/04842* (2022.01)
*G06F 3/04845* (2022.01)

(52) U.S. Cl.
CPC ...... *G06F 3/04845* (2013.01); *G06F 3/04842* (2013.01)

(58) Field of Classification Search
None
See application file for complete search history.

(56) References Cited

U.S. PATENT DOCUMENTS

| | | | | |
|---|---|---|---|---|
| 6,134,557 A * | 10/2000 | Freeman | ............ | G06Q 10/0875 707/999.102 |
| 9,500,479 B2 * | 11/2016 | Kumagai | ................ | G01C 15/00 |
| 10,473,473 B2 * | 11/2019 | Shi | ...................... | G01C 21/3688 |
| 2003/0028393 A1 * | 2/2003 | Coulston | ............ | G06Q 30/0283 705/30 |
| 2009/0259601 A1 * | 10/2009 | DiPaolo | ................. | G06Q 50/04 52/741.1 |
| 2012/0095829 A1 * | 4/2012 | Harper | ............... | G06Q 30/0251 705/14.49 |
| 2014/0032362 A1 * | 1/2014 | Frayman | ............ | G06Q 30/0633 705/26.8 |
| 2021/0117582 A1 * | 4/2021 | Kamenca | ................ | G06F 30/13 |

OTHER PUBLICATIONS

DavData, Polygon Overlap Calculator, published Apr. 20, 2021, via web.archive.org, http://web.archive.org/web/20210420210325/https://davdata.nl/math/overlap.html (Year: 2021).*

* cited by examiner

*Primary Examiner* — Henry Orr
(74) *Attorney, Agent, or Firm* — ANOVA LAW GROUP, PLLC

(57) ABSTRACT

A method for trajectory processing includes: displaying, on a graphical user interface, a plurality of trajectory diagrams of multiple spaces, wherein each space corresponds to at least one of the trajectory diagrams; determining a target space on the graphical user interface, wherein a perimeter of the target space being formed by boundaries of two or more spaces of the multiple spaces; determining attribute information of the two or more spaces, wherein the attribute information of a space includes at least an area of the space calculated based on one or more of the trajectory diagrams that correspond to the space; and determining an area of the target space based on the areas of the two or more spaces.

19 Claims, 9 Drawing Sheets

Displaying, on a graphical user interface, a plurality of trajectory diagrams of multiple spaces S302

Determining a target space on the graphical user interface, a perimeter of the target space being formed by boundaries of two or more spaces of the multiple spaces S304

Determining attribute information of the two or more spaces, the attribute information of a space including at least an area of the space calculated based on one or more of the trajectory diagrams that correspond to the space S306

Determining an area of the target space based on the areas of the two or more spaces S308

FIG. 3A

Displaying, on a graphical user interface, a plurality of trajectory diagrams of multiple spaces S302

Determining, for each space of at least two spaces, attribute information of the space, the attribute information of a space including at least an area of the space and target construction object information of the space S310

Determining, according to the attribute information of the at least two spaces, construction information for the at least two spaces S312

FIG. 3B

TRAJECTORY PROCESSING METHOD AND APPARATUS

TECHNICAL FIELD

The present disclosure relates to the field of trajectory processing, and more particularly, to trajectory processing method and apparatus.

BACKGROUND

Currently, people use ranging devices to measure and plan routes and the area in all aspects of life and work, such as in the field of construction, road engineering, transportation, pipeline laying, landscape areas, etc. After a trajectory is obtained using a ranging device or other means, there is a need to process the trajectory and provide a graphical user interface to present the ranged area based on the processed trajectory.

SUMMARY

In one aspect of the present disclosure, a method for trajectory processing is provided. The method includes: displaying, on a graphical user interface, a plurality of trajectory diagrams of multiple spaces, wherein each space corresponds to at least one of the trajectory diagrams; determining a target space on the graphical user interface, wherein a perimeter of the target space being formed by boundaries of two or more spaces of the multiple spaces; determining attribute information of the two or more spaces, wherein the attribute information of a space includes at least an area of the space calculated based on one or more of the trajectory diagrams that correspond to the space; and determining an area of the target space based on the areas of the two or more spaces.

In another aspect of the present disclosure, an apparatus for trajectory processing is provided. The apparatus includes: at least one memory and at least one processor coupled to the at least one memory. The at least one processor is configured to execute a computer program stored in the at least one memory and perform: displaying, on a graphical user interface, a plurality of trajectory diagrams of multiple spaces, wherein each space corresponds to at least one of the trajectory diagrams; determining a target space on the graphical user interface, wherein a perimeter of the target space being formed by boundaries of two or more spaces of the multiple spaces; determining attribute information of the two or more spaces, wherein the attribute information of a space includes at least an area of the space calculated based on one or more of the trajectory diagrams that correspond to the space; and determining an area of the target space based on the areas of the two or more spaces.

The above aspects will be made clear by the following detailed description and accompanying drawings.

BRIEF DESCRIPTION OF THE DRAWINGS

In order to more clearly illustrate the technical solutions in the embodiments of the present disclosure, the drawings used in the description of the embodiments will be briefly described below. The drawings in the following description are only some embodiments of the present disclosure. Other drawings may be obtained by those of ordinary skill in the art based on these drawings.

FIG. 3A is a flow chart of a trajectory processing procedure according to some embodiments of the present disclosure.

FIG. 3B is a flow chart of another trajectory processing procedure according to some embodiments of the present disclosure.

DETAILED DESCRIPTION

The technical solutions according to the embodiments of the present disclosure is described in the following with reference to the accompanying drawings. The implementation manners described in the following exemplary embodiments do not represent all embodiments of the present disclosure. Instead, they are merely examples of devices and methods consistent with aspects provided by the present disclosure as detailed in the claims. All other embodiments obtained by a person of ordinary skill in the art based on the embodiments of the present disclosure without creative efforts are within the scope of the present disclosure.

In the present disclosure, relational terms such as "first" and "second" are used merely to distinguish one entity or operation from another entity or operation, and do not necessarily require or imply actual relationship or order between these entities or operations. The terms "comprise", "include", or any other variations intended to cover a non-exclusive inclusion, such that a process, method, article, or device that having a plurality of elements, include not only those elements but also other items not specifically listed elements, or elements that are inherent to such a process, method, item, or device. Unless otherwise limited, an element that is defined by the phrase "comprising a . . .

" does not exclude the presence of additional equivalent elements in the process, method, item, or device that comprises the element.

The present disclosure provides a method and apparatus for trajectory processing. Multiple trajectories may be obtained from any suitable means, such as a ranging system. The trajectories may be processed to obtain desired information for display. User interactions may be detected to obtain requirements and instructions for processing the trajectories and presenting desired information based on a processing result.

Figure 1:
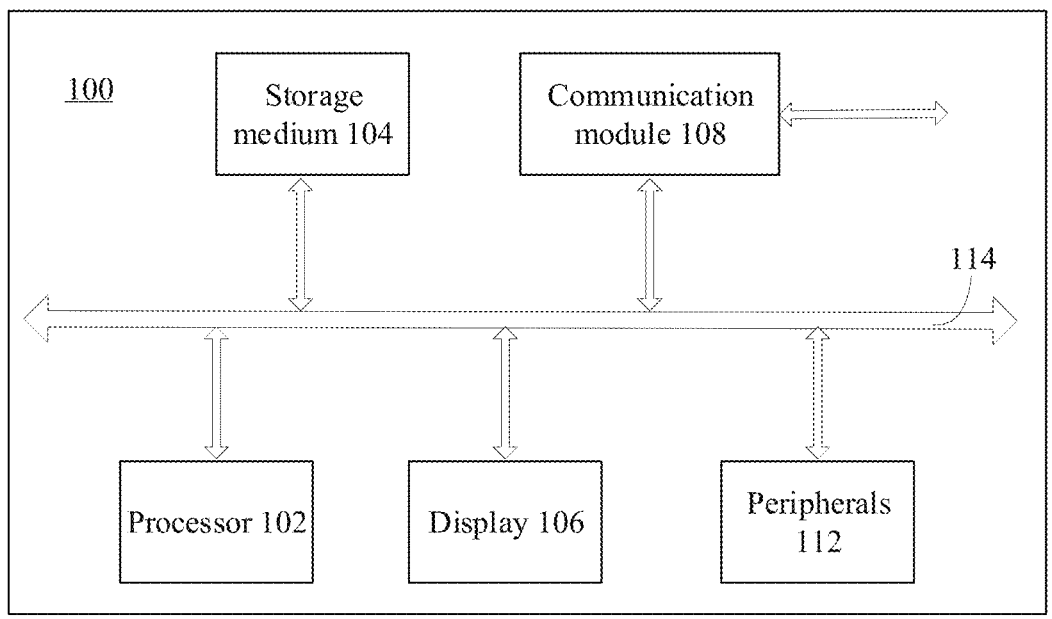
FIG. 1 is a block diagram of an exemplary computing system according to some embodiments of the present disclosure.

FIG. 1 is a block diagram of an exemplary computing system/apparatus capable of implementing the disclosed trajectory processing method according to some embodiments of the present disclosure. As shown in FIG. 1, computing system 100 may include a processor 102 and a storage medium 104. According to certain embodiments, the computing system 100 may further include a display 106, a communication module 108, additional peripheral devices 112, and one or more bus 114 to couple the devices together. Certain devices may be omitted and other devices may be included. According to certain embodiments, the apparatus may be a smart cellphone, a tablet, a computer, or a handheld equipment.

Processor 102 may include any appropriate processor(s). In certain embodiments, processor 102 may include multiple cores for multi-thread or parallel processing, and/or graphics processing unit (GPU). Processor 102 may execute sequences of computer program instructions to perform various processes, such as trajectory processing, responding to interactions on graphical user interface, etc. Storage medium 104 may be a non-transitory computer-readable storage medium, and may include memory modules, such as ROM, RAM, flash memory modules, and erasable and rewritable memory, and mass storages, such as CD-ROM, U-disk, and hard disk, etc. Storage medium 104 may store computer programs for implementing various processes, when executed by processor 102. Storage medium 104 may also include one or more databases for storing certain data such as trajectory processing algorithm program, attribute information of construction and landscaping materials, links to online database and/or shopping sites, and certain operations can be performed on the stored data, such as database searching and data retrieving.

The communication module 108 may include network devices for establishing connections through a network. Display 106 may include any appropriate type of computer display device or electronic device display (e.g., CRT or LCD based devices, touch screens). Peripherals 112 may include additional I/O devices, such as a keyboard, a mouse, and so on.

In operation, the processor 102 may be configured to execute instructions stored on the storage medium 104 and perform various operations related to a trajectory processing method as detailed in the following descriptions.

Figure 2:
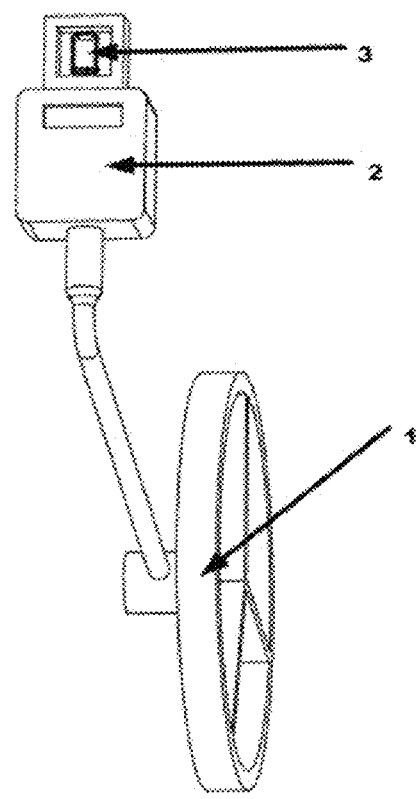
FIG. 2 is a schematic structural view of a ranging system according to an embodiment of the present disclosure.

FIG. 2 is a schematic structural view of a ranging system according to an embodiment of the present disclosure. The ranging system may be used to retrieve one or more trajectories to be processed. The computer system 100 configured to process the trajectory data may be a part of the ranging system or an individual apparatus that does not necessarily have ranging capabilities.

As shown in FIG. 2, an example ranging system may include a ranging apparatus, an angle sensor disposed in a terminal device 3 or in the ranging apparatus, and a processor. The terminal device 3 may be implemented by the computing system 100 and configured to execute the disclosed trajectory processing method. The ranging apparatus includes a measuring wheel, a rotating shaft disposed on the measuring wheel 1, and an electronic counter 2 connected to the rotating shaft and configured to obtain distance information, in real time, of a route which the measuring wheel has already traveled. The angle sensor is configured to obtain angle information in real time. The processor is configured to generate a traveling trajectory diagram of the measuring wheel based on the distance information from the electronic counter and the angle information from the angle sensor, and perform optimization processing on the traveling trajectory to generate an optimized trajectory diagram.

In some embodiments, the processor is coupled to the ranging apparatus and can obtain the distance information directly from the electronic counter. For example, the processor may be disposed on a rotating shaft, a measuring wheel, or a holder of the ranging apparatus. When angle sensor is also resided in the ranging apparatus, the processor may also obtain the angle information from the angle sensor directly. When the angle sensor is not in the ranging apparatus, the processor is configured to obtain the angle information from the angle sensor via a communication module.

In some other embodiments, the processor is resided in a terminal device capable of communicating with the ranging apparatus. In one embodiment, the terminal device may be in a proximity of the ranging apparatus during a ranging session, such as carried by a staff operating the ranging apparatus, fixed on the ranging apparatus through a device holder. For example, the terminal device may communicate with the ranging apparatus in real time as the ranging apparatus is collecting distance information. Alternatively, in another embodiment, the terminal device may not be present during the ranging session, and may communicate with the ranging apparatus after the ranging apparatus has completed the ranging session. In one example, the ranging apparatus may store the distance information and the angle information recorded in a field (e.g., a target physical scene) and later transmit the stored information to the terminal device at another site (e.g., in an office). In another example, the angle sensor may store the angle information in a storage medium, and the processor of the terminal device may obtain angle information from the storage medium.

The optimized trajectory diagram generated by the processor may be presented in a display device. In one embodiment, the display device and the processor are both coupled to or included in the ranging apparatus, and the processor disposed in the ranging apparatus may send the optimized trajectory diagram to the display device to be presented to a user at a time when the optimized trajectory diagram is generated or when a user command of viewing a trajectory is received (e.g., on a touchscreen of the display device). In another embodiment, the display device may be a device external to the ranging apparatus and the processor is disposed in the ranging apparatus, and after the ranging apparatus has completed a measuring session, the display device may be connected to the ranging apparatus and receive the optimized trajectory diagram from the processor disposed in the ranging apparatus for display. In yet another embodiment, the display device and the processor are both included in the terminal device. FIGS. 4A, 4B, 5, 6A and 7B illustrate example trajectories presented by the display device.

The ranging system may combine the application of an electronic counter and an angle sensor to generate a drawing of the traveling trajectory, in real time, by a processor disposed in the terminal device or in the ranging apparatus based on the data measured by the ranging apparatus and the angle sensor. This approach does not only achieve distance measurement, but also generates the diagram of the traveling trajectory in real time. There is no need to perform ranging segment by segment, and create the trajectory diagram in a post-processing step. Thus, work efficiency of the ranging system is effectively improved.

In certain embodiments, the ranging system may also be used to mark lines or points in a real physical scene, such as on a field or in a construction site. For example, the ranging system may include one or more markers. The marker may be connected to the rotating shaft so that the user may activate the markers to mark points or lines on the traveling route of the measuring wheel on a field or a contraction site. The activation of the markers may be performed by the processor disposed in the ranging apparatus or in the terminal device.

In certain embodiments, the ranging system may be configured to further measure altitude or height information, and display the altitude or height information of one or more sampling points. In certain embodiments, the measuring wheel may be equipped with an altitude sensor. In certain embodiments, a gravity accelerometer configured in the measuring wheel device or in the terminal device may detect a tilt angle when the measuring wheel is pushed, so a height at a sampling point may be calculated according to the tilt angle and a traveled distance that has been traveled after the tilt angle changes. The height H may be calculated according to the tilt angle $\alpha$ and the traveled distance D based on trigonometry calculation. The above calculation may be implemented by the data processing unit (i.e., processor) of the ranging system. In certain embodiments, the altitude or height information may be acquired by the terminal device using an augmented reality (AR) function available on certain smart devices. In certain embodiments, altitude or height information may be acquired by two or more methods describe above, and an average value may be calculated to improve measurement accuracy.

Although FIG. 2 show the configuration in which the terminal device 3 is fixed on the ranging apparatus via the holder, the present disclosure is not limited thereto. Instead, the terminal device does not have to be fixed on the ranging apparatus to obtain distance information and angle information by the way of wireless communication by using the wireless communication module disposed in the ranging apparatus and the terminal device. The wireless communication module may be implemented with Bluetooth, WIFI, Zigbee or RF protocols.

A storage medium may be used to store distance information, angle information and/or the traveling trajectory diagrams generated by the processor. The stored information may be retrieved later.

The ranging system according to the present disclosure may further comprise a cloud server. The processor of the ranging system and the cloud server may be connected to Internet. The cloud server may be used for storing and sharing the data sent by the processor of the ranging system. The data may include: distance information from the electronic counter, angle information from the angle sensor, and/or the generated traveling trajectory diagram. Further, the processor of the ranging system may obtain predesigned traveling trajectory diagram from the cloud server. In this manner, the stored data may be retrieved in real time and the testing data or diagram may be shared with other engineering staff to effectively improve the work quality and efficiency. In certain embodiments, the traveling trajectory generated by the processor of the ranging system and uploaded to the cloud server may be the predesigned traveling trajectory diagram to be obtained.

In certain embodiments, the processor of the ranging system may generate a trajectory diagram by connecting a plurality of sampling points, each sampling point being define by distance and angle data obtained from the electronic counter and the angle sensor. A starting point of the trajectory diagram may be selected by a user or from a pre-configured position, such as a center point of the display screen. In certain embodiments, during or after the generation of the trajectory diagram, the processor may perform further processing to optimize the trajectory.

It can be understood that the trajectory to be processed can be obtained from any suitable means or devices other than the example ranging system shown in FIG. 2, such as trajectory data extracted from an electronic map, trajectory data collected by other measurement equipment (e.g., laser, lidar, camera, etc.), trajectory data based on manual drawing or engineering drawing, etc. The trajectory data may include 2D and/or 3D information of a corresponding space. There may be multiple trajectory diagrams to be processed and each diagram may be obtained from the same or different means. In an example embodiment, one trajectory diagram may refer to a plurality of sample points that can form a continuous boundary of certain space. In some cases, the trajectory diagram may be a closed diagram. In other cases, the trajectory diagram may be combined with one or more other trajectory diagrams to form a closed diagram.

FIG. 3A is a flow chart of a trajectory processing procedure S300 according to some embodiments of the present disclosure. The trajectory processing procedure S300 may be implemented by a trajectory processing apparatus, such as the computing system 100.

As shown in FIG. 3A, a plurality of trajectory diagrams of multiple spaces may be displayed on a graphical user interface (S302). Each space corresponds to at least one of the trajectory diagrams. That is, each space may be formed by one or more trajectory diagrams. As previously discussed, the plurality of trajectory diagrams may include trajectory data from any suitable means. Further, each space may have a closed boundary. In one embodiment, each space is a two-dimensional area, and an area of the space can be predetermined based on the corresponding trajectory diagram(s). In another embodiment, each space can be a three-dimensional place, and a bottom area and/or a volume of the space can be predetermined based on the corresponding trajectory diagram(s). In one example, as shown in FIG. 9A, two trajectory diagrams of two 2D spaces are shown. The application can further provide a load/remove trajectory function for users to add another trajectory or delete existing trajectory. In another example, the trajectory diagrams shown in FIGS. 4A, 4B, and 5 can be presented in a graphical user interface like FIG. 9A. Further, the graphical user interface can present 3D spaces in different views, such as those shown in FIGS. 6A, 6B, 7A, 7B, 8A and 8B.

Figure 4A:
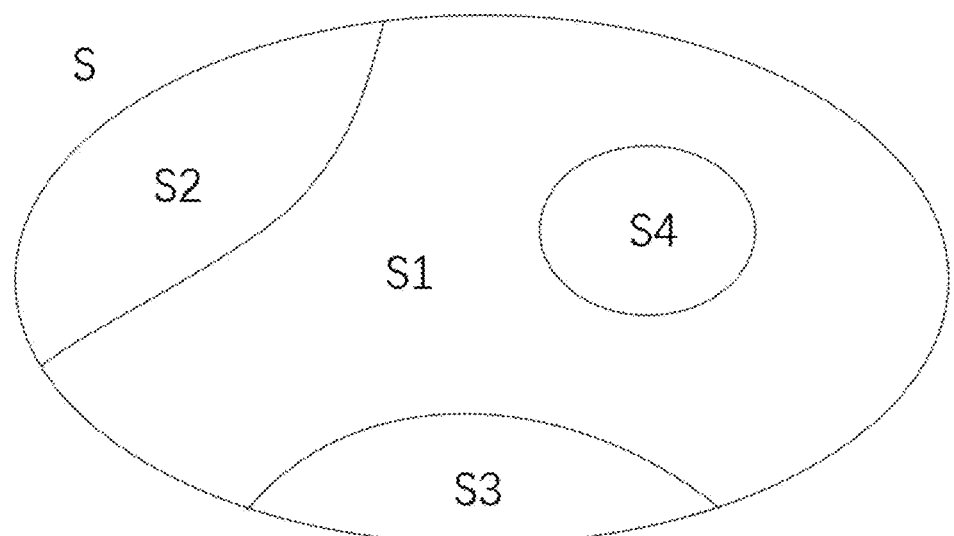
FIG. 4A is a schematic diagram of example trajectory diagrams according to an embodiment of the present disclosure.
Figure 9A:
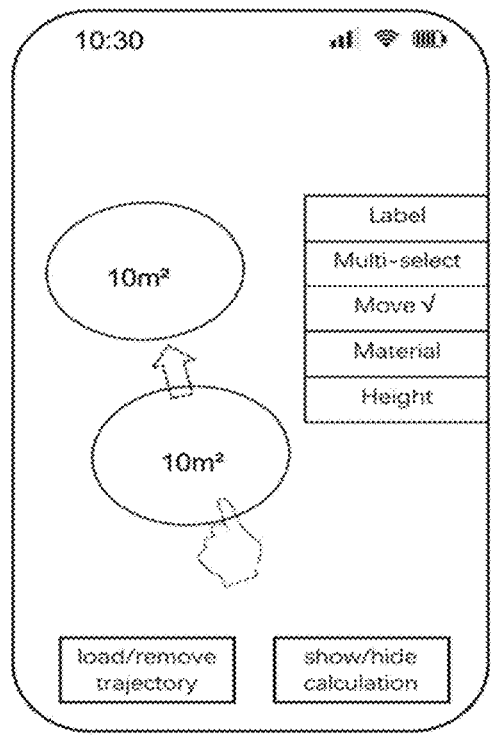
FIG. 9A-9G are schematic diagrams of example graphical user interfaces according to some embodiments of the present disclosure.
Figure 9B:
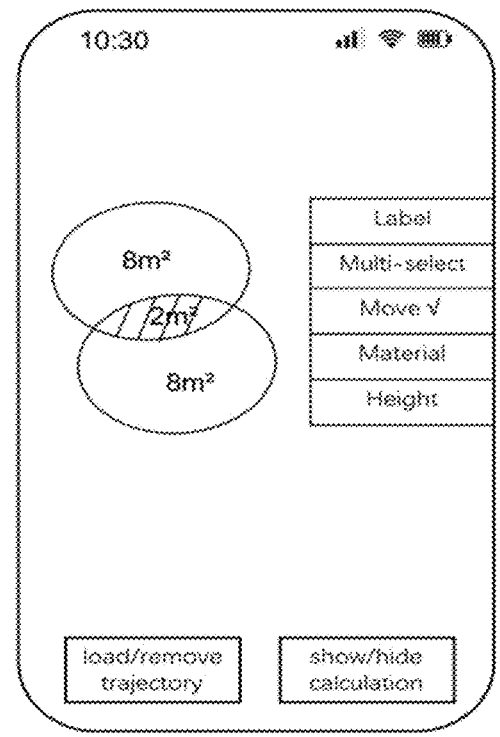

A target space on the graphical user interface (GUI) can be determined (S304). A perimeter of the target space is formed by boundaries of two or more spaces of the multiple spaces. In other words, partial or all boundary of one space can overlap or constitute a part of the perimeter of the target space. In one example, as shown in FIG. 4A, data corresponding to trajectory diagrams of spaces S, S2, S3, and S4 are available. The target space is space S1. The perimeter of the target space S1 is formed by partial boundaries of spaces S, S2, S3, and S4. In another example, as shown in FIG. 9B, the shaded area is formed by partial boundaries of the two trajectories shown in FIG. 9A.

Figure 4B:
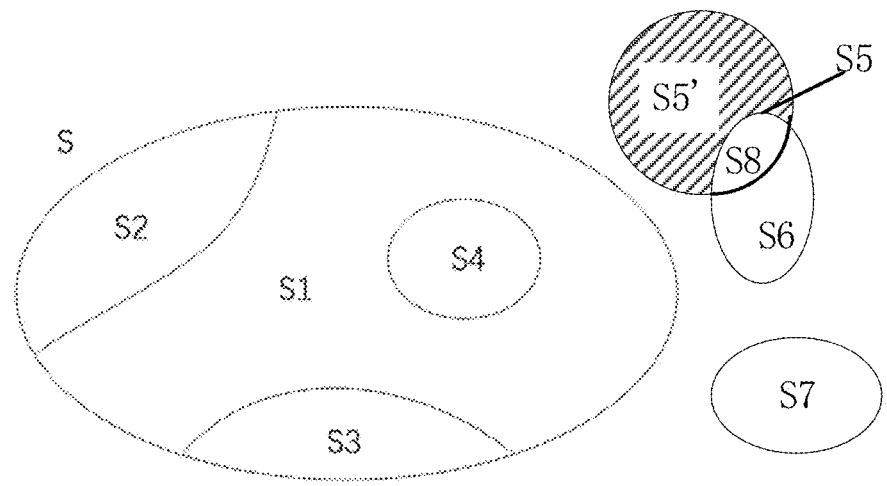
FIG. 4B is a schematic diagram of example trajectory diagrams according to another embodiment of the present disclosure.

In some embodiments, the procedure S300 may further include: determining positional relationships among the multiple spaces; and simultaneously displaying the plurality of trajectory diagrams of the multiple spaces according to positional relationships among the multiple spaces. In one embodiment, the positional relationships among the multiple spaces is determined based on coordinates of the trajectory diagrams. The coordinates may be geographical coordinates. Continuing to use FIG. 4A as an example, the positional relationships of S, S2, S3, and S4 can be determined and used to display them simultaneously on the GUI. In another example, as shown in FIG. 4B, based on the coordinates, S5 and S6 may be displayed as having an overlapping area of S8. In one embodiment, a first trajectory diagram of the trajectory diagrams on the graphical user interface may be moved based on a user movement operation on the first trajectory diagram; and the positional relationship between a space corresponding to the first trajectory diagram and another space may be updated based on the user movement operation. For example, the trajectory processing apparatus may load and present trajectory diagrams of spaces S, S2, S3, S4, S5, S6, and S7 on the screen, and the user may drag and drop desired spaces (e.g., spaces S, S2, S3 and S4 as shown in FIG. 4A, or all spaces as shown in FIG. 4B) on the GUI and adjust their positional relationship(s) as needed. In one example, the overlapping area of S5 and S6 may be adjusted based on a user movement operation. In another example, as shown in FIGS. 9A and 9B, a "move" icon on the menu may be selected, and a user movement operation that moves the lower trajectory towards the upper trajectory may be detected, and an overlapping area (e.g., shaded area in FIG. 9B) may be formed as a result of the user movement operation.

Figure 9C:
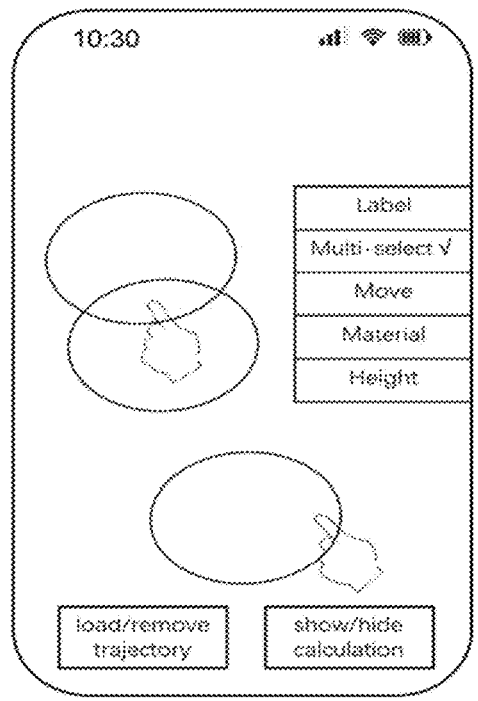
Figure 9D:
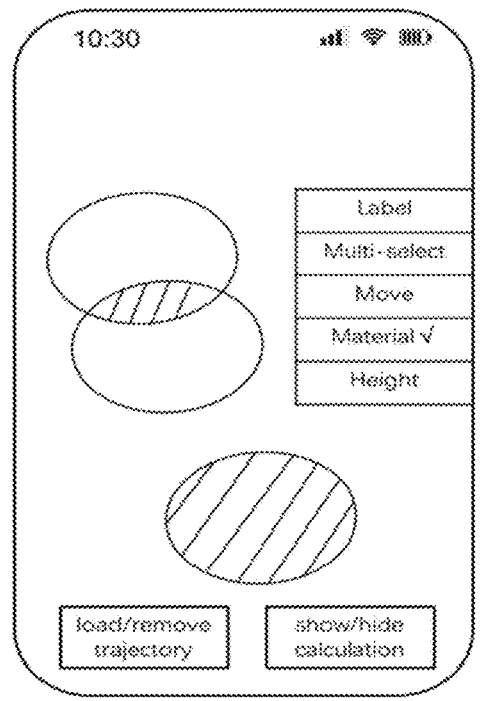

In some embodiments, step S304 may further include: identifying one or more candidate spaces on the graphical user interface, a perimeter of each candidate being formed by boundaries of two or more of the multiple spaces; and determining one of the one or more candidate spaces as the target space. A candidate space may be a space that does belong to the multiple spaces identified in step S302 and/or a space that does not have predetermined area/volume. In the example shown in FIG. 4A, the candidate space is S1. In the example shown in FIG. 4B, the candidate spaces include S1 and the overlapping area between S5 and S6. In some embodiments, the candidate spaces may be highlighted to solicit user selection. In one embodiment, the target space may be determined based on user selection. For example, a tap operation on a position of the GUI may indicate a desired target space. When the tapped position correspond to multiple spaces, the trajectory processing apparatus may highlight each of the multiple spaces based on number of taps (e.g., continuous taps) received at the same or similar position. A bigger number of taps may correspond to a bigger space containing the tapped position. For example, when a first tap operation is detected within S4, the space S4 may be highlighted first; when a second tap operation is detected within S4, the space formed by S1+S4 may be highlighted; when a third tap operation is detected within S4, the space formed by S1+S3+S4 may be highlighted; when a fourth tap operation is detected within S4, the space formed by S1+S2+S4 may be highlighted; when a fifth tap operation is detected within S4, the space S may be highlighted. Further, when a sixth tap operation is detected within S4, none of the spaces are selected; and when a seventh tap operation is detected within S4, the effect is the same as the first tap operation. In another embodiment, the target space may be determined automatically by the trajectory processing apparatus. For example, the trajectory processing apparatus may automatically identify S1 as a first target space, the overlapping area S8 between S5 and S6 as a second target space, the area within S5 but does not include S8 (i.e., the dashed space S5') as a third target space, and the area within S6 but does not include S8 as a fourth target space. In another example, as shown in FIG. 9C, when "multi-select" icon is chosen, selection operation of target space(s) can be detected based on user selection operations (e.g., tapping). As shown in FIG. 9D, a target space containing two shaded areas are identified based on the user selection operations.

In some embodiments, the one or more candidate spaces include at least one of: a sub-space of one of the multiple spaces that does not overlap with another space of the multiple spaces (e.g., space S1 in FIG. 4A), or a space including a portion that overlaps with one of the multiple spaces (e.g., the overlapping area S8 between circular space S5 and oval space S6 in FIG. 4B).

As the target space is determined, the procedure 300 may further include: determining attribute information of the two or more spaces (S306), and determining an area of the target space based on the areas of the two or more spaces (S308). The attribute information of a space includes at least an area of the space calculated based on one or more of the trajectory diagrams that correspond to the space. For example, an area or a volume of the target space can be determined based on the positional relationships of the two or more spaces (whose boundaries form the perimeter of the target space) and the areas of the two or more spaces. For example, as shown in FIG. 9A, a "show/hide calculation" icon is provided on the GUI to enable switching between presenting or hiding area/volume of spaces. When trajectories are loaded in the GUI, areas or volumes of the spaces of known trajectories can be presented. Further, as shown in FIG. 9B, an area of the overlapped space (i.e., shaded area) created based on the user movement operation can be presented. As one space being moved towards or further away from the other space, the area of the overlapped space can be updated accordingly, (e.g., updated from 2 m² to 1 m² when the lower space is moved away from the upper space thereby creating less overlapped space).

In one embodiment, the GUI may include a first space (e.g., space S) that consists of one or more second sub-spaces (e.g., space S2, S3, and S4) and the target space (e.g., space S1). The one or more second sub-spaces and the target space do not overlap with each other, and the first space and the one or more spaces all belong to the multiple spaces identified in step S302. In this case, when executing step S308, the area of the target space (e.g., space S1) can be determined by: determining, for each of the second sub-space, an area of the second sub-space (e.g., predetermined based on the coordinates in the corresponding trajectory diagram; determining a total area of the first space (e.g., predetermined based on the coordinates in the corresponding trajectory diagram of the first space); and determining an area of the target space based on the area of the one or more second sub-spaces and the total area of the first space (e.g., by subtracting the areas of the one or more second sub-spaces from the total area of the first space).

In another embodiment, the target space (e.g., circular space S5) and a third space (e.g., oval space S6) have an overlapping space (e.g., space S8) and form a fourth space (e.g., the combined space of S5 and S6) together. The third space, the fourth space, and the overlapping space all belong to the multiple spaces. In this case, when executing step S308, the area of the target space can be determined by:

determining an area of the third space, an area of the fourth space, and an area of the overlapping space based on the geographical coordinates in the corresponding trajectory diagrams; and determining an area of the target space based on the area of the third space, the area of the fourth space, and the area of the overlapping space (e.g., subtract the area of oval space S6 from the area of combined space of S5 and S6, then add the area of the overlapping space S8).

In another embodiment, an overlapping space (e.g., space S8) may be created by a user operation of moving the third space (e.g., space S6) and/or a fifth space (e.g., space S5). The third space and the fifth space belong to the multiple spaces. An area of the overlapping space may be determined based on the trajectory diagrams of the third space and the fifth space and a positional relationship between the third space and the fifth space. The target space (e.g., dashed space S5') and the overlapping space (e.g., space S8) may form the fifth space (e.g., circular space S5) . . . . In this case, when executing step S308, the area of the target space can be determined based on the area of the fifth space and the area of the overlapping space (e.g., subtract the area of overlapping space S8 from the circular space S5).

In related art, surveying and mapping devices can only measure the area of a single space, but cannot provide areas/volumes of multiple spaces and new spaces formed by the multiple spaces. To address this technical problem and other problems, the present disclosure provides a trajectory method, which is implemented based on at least two spaces whose trajectories may be obtained from ranging device(s). A new space can be formed when combining at least two spaces after relative positional relationship(s) among the at least two spaces are determined. The new space is the target space to be measured. In this way, the disclosed method not only uses ranging and mapping results, but also combine a user selection of the relative positions of the at least two spaces, which enables attribute information determination of target spaces formed by different combinations of known spaces. The new target space(s) is a continuous area or volume. That is to say, the attribute information of the new target spaces is not only based on attribute information of the known/ranged spaces, but may also consider relative positions specified by the user. This can be particularly useful in construction planning. In addition, by providing a graphical user interface that simultaneously displays the known spaces and new spaces, the user can intuitively make adjustments and selections of desired spaces.

Figure 7A:
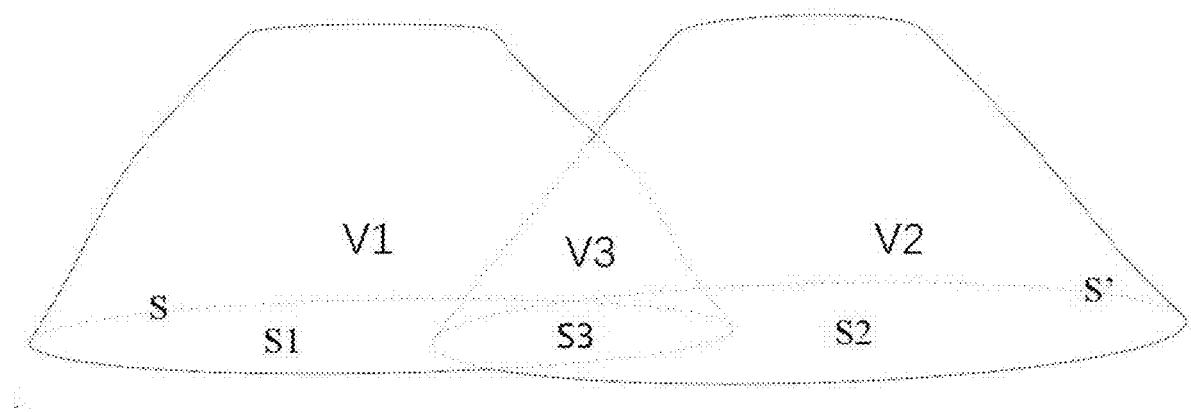
FIG. 7A is a schematic diagram of example hills according to an embodiment of the present disclosure.
Figure 7B:
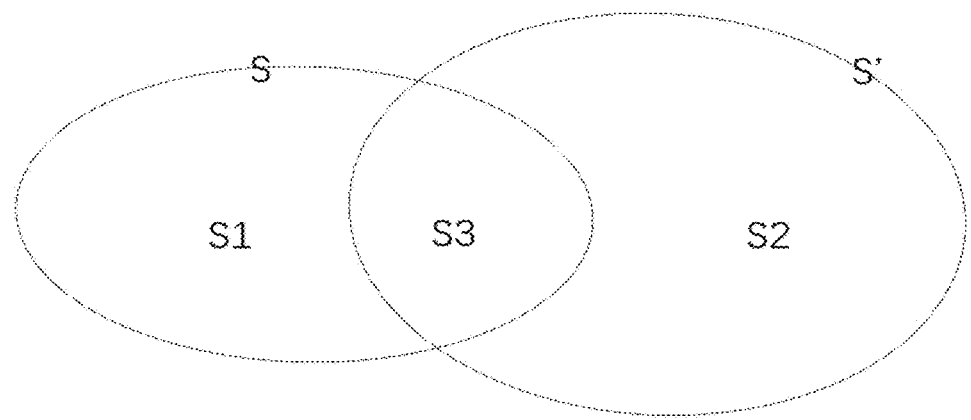
FIG. 7B is a schematic diagram of a bottom view of the two hills shown in FIG. 7A.

As shown in FIG. 7B, trajectory diagrams obtained from the ranging device may correspond to spaces S and S', which are presented on the GUI. A user can drag and drop the graphics S and S', thereby affecting a size of an over lapping area between the graphics S and S', that is, the size of the area of S3, also affecting the size of the non-overlapping areas S1 and S2. The procedure S300 may include: determining relative positions of the at least two graphics S and S' to form a combined graphic; and after determining the relative positions of graphics S and S', calculating the area of at least one continuous region in the combined graphic, such as the area of any one or more regions in S1, S2 or S3. It can be seen from the example of FIG. 7B that the disclosed trajectory processing method allows the user of the ranging and mapping tool to specify additional preference and planning on the surveyed spaces S and S', and attribute information of the space obtained through the additional planning (such as the area of at least one continuous space in the combined graph, e.g., one or more areas in S1, S2 or S3 shown in FIG. 7B) can also be calculated by integrating the trajectory diagrams of the measured spaces and user specified relative positions.

In some embodiments, the attribute information of a space further comprises target construction object information of the space. The target construction object information of a space may be information about a target construction object to be used at the space, and the target construction object is a product and/or a service to be applied in the space. For example, the target construction object information may include at least one of: brand, price, specification, inventory, or hyperlink information associated with the target construction object.

Further, the procedure S300 may include determining, according to the attribute information of the two or more spaces, target construction information for the target space.

FIG. 3B is a flow chart of another trajectory processing procedure S300 according to some embodiments of the present disclosure. The trajectory processing procedure S300 may be implemented by a trajectory processing apparatus, such as the computing system 100.

As shown in FIG. 3B, a plurality of trajectory diagrams of multiple spaces may be displayed on a graphical user interface (S302). Each space corresponds to at least one of the trajectory diagrams. That is, each space may be formed by one or more trajectory diagrams. As previously discussed, the plurality of trajectory diagrams may include trajectory data from any suitable means. Further, each space may have a closed boundary. In one embodiment, each space is a two-dimensional area, and an area of the space can be predetermined based on the corresponding trajectory diagram(s). In another embodiment, each space can be a three-dimensional place, and a bottom area and/or a volume of the space can be predetermined based on the corresponding trajectory diagram(s).

For each space of at least two spaces, attribute information of the space may be determined (S310). The at least two spaces may include one or more spaces from the multiple spaces identified in S302, and/or one or more of the target space identified in S304. In some embodiments, the multiple spaces and the one or more target space may include at least two types of spaces. The attribute information of a space includes at least an area of the space and target construction object information of the space.

Figure 9E:
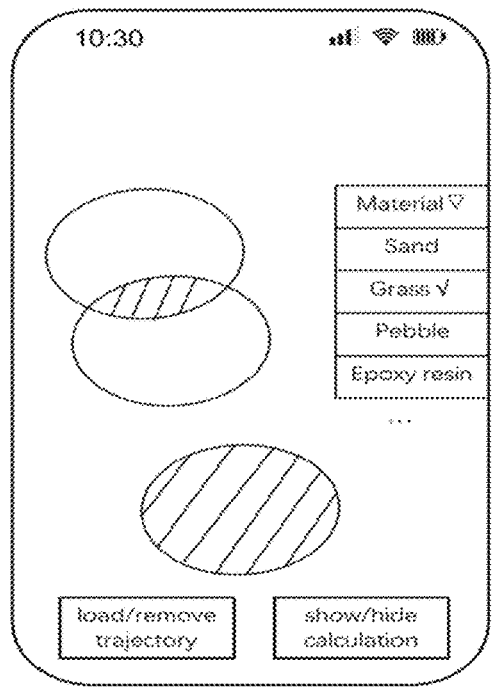
Figure 9F:
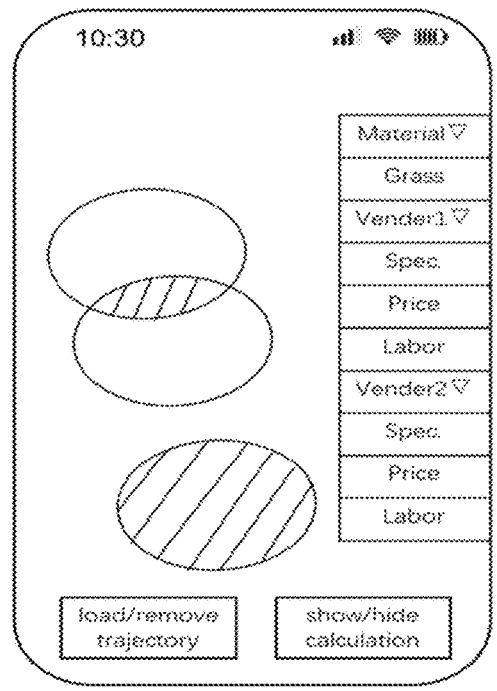
Figure 9G:
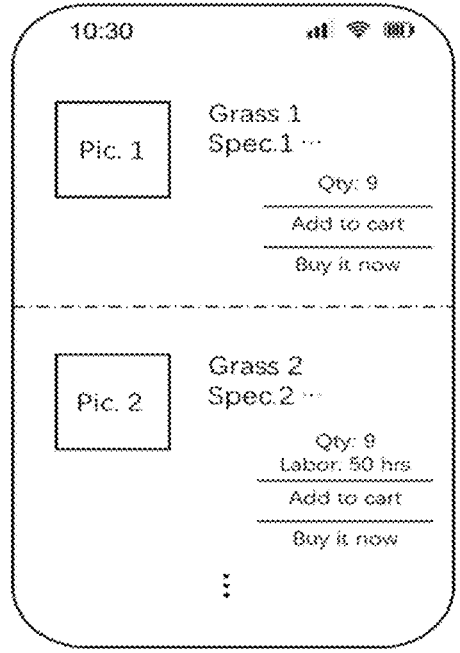

In some embodiments, the target construction object information of a space includes information about a target construction object to be used at the space, and the target construction object is a product and/or a service to be applied in the space. The type of target construction object of a space may be determined in various ways, such as being specified in trajectory data, being identified by a user from multiple candidate construction objects shown on the GUI, etc. For example, in response to "material" icon being selected as shown in FIG. 9D, multiple types of materials can be presented in the menu as shown in FIG. 9E. The candidate construction objects may be stored on the trajectory processing apparatus and/or obtained from online database/website. In some embodiments, the target construction object information includes at least one of: brand, price, specification, inventory, or hyperlink information associated with the target construction object. For example, in response to "grass" icon being selected as shown in FIG. 9E, multiple vendors for grass can be presented in the menu as shown in FIG. 9F, together with their respective specification, price, and labor cost. In some embodiments, the target construction object information may be prestored in the trajectory processing apparatus and/or obtained from online database/ website. In some embodiments, for the same construction object, multiple service/product providers may be queried for price and specs. The trajectory processing apparatus may present the target construction object information from multiple providers on the GUI to facilitate a user to make an informed selection. In addition, basic construction information entered by a provider may include material unit price, labor unit price, construction speed, material loss rate, etc., and the trajectory processing apparatus may automatically calculate a total quantity, a total price and/or a total construction period based on the basic construction information and the area/volume of the space where the construction object is going to be used. For example, as shown in FIG. 9G, the quantity of grass needed for the identified target space in FIG. 9D and/or the labor of laying the grass can be presented.

In some embodiments, when multiple spaces (areas or volumes) are involved in a site, the different areas, volumes, and/or different levels in a same space can be distinguished by different colors and/or textures.

Further, construction information for the at least two spaces can be determined according to the attribute information of the at least two spaces (S312). Compared to related art where construction information of only one space could be provided, the disclosed procedure can determine and present construction information for a plurality of spaces. In some embodiments, the trajectory processing apparatus may communicate with a background server of an e-commerce platform to submit an order for the target construction object, schedule an appointment for construction, and make payment for the construction related services. For example, as shown in FIG. 9G, detailed information of target construction object (e.g., grass) can be presented and purchase links from different vendors are provided. The user can submit an order through the GUI provided by the application program.

In some embodiments, the procedure S300 may further include: determining that the at least two spaces belong to a same type based on the attribute information of the at least two spaces, where the attribute information of the at least two spaces include a same target construction object. In this case, step S312 may include: determining the total construction information for the at least two spaces based on the area of each of the at least two spaces and the target construction object information of the same target construction object.

In some embodiments, the total construction information includes at least one of: a total quantity or a total volume of the target construction object for the at least two spaces, a total cost of the target construction object for the at least two spaces, or a total service period of the target construction object for the at least two spaces. Further, additional information of a construction project related to the target construction object can be determined (e.g., entered by a user), such as location of a construction site, contact information, etc., for placing an order and/or making an appointment with a service provider to carry out the construction project.

In one embodiment, the at least two spaces are determined as belonging to the same type in response to determining that a default utility of the at least two spaces is the same. In another embodiment, the at least two spaces are determined as belonging to the same type in response to detecting a first user operation that identifies the at least two spaces with a same label on the graphical user interface. In another embodiment, the at least two spaces are determined as belonging to the same type in response to detecting a second user operation that selects a same target construction object for the at least two spaces on the graphical user interface. In related art, a construction project may require a user to obtain measurement data, manually calculate total construction materials for the project, and purchase materials in a local store. In the disclosed method, all steps can be performed within one application program on an electronic device. The application program can facilitate a user to identify desired space(s) and desired material(s), can automatically determine quantity of the desired materials based on the area/volume of the desired space(s), and can facilitate online order of said materials, which greatly improves efficiency of construction project planning and execution.

Figure 5:
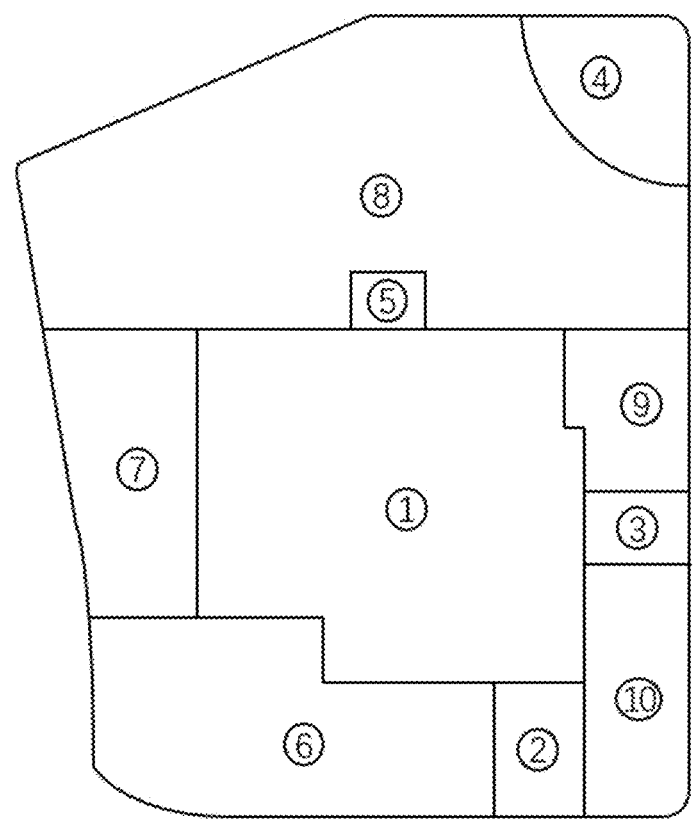
FIG. 5 is a schematic diagram of example trajectory diagrams related to construction information determination according to some embodiments of the present disclosure.

FIG. 5 is a schematic diagram of example trajectory diagrams related to construction information determination according to some embodiments of the present disclosure. As shown in FIG. 5, a courtyard plan may include a house 1, a garage 2, a passage way 3, a pool 4, and multiple landscape areas 5-10.

In this example, a ranging wheel is pushed along the ground contour in the real scene of the courtyard to establish multiple trajectories and form multiple trajectory graphs. The area of each trajectory graph can be automatically calculated based on sample points in the trajectory diagram and displayed on the user terminal. In an application provided by the trajectory processing apparatus, the generated graphics can be manually translated and rotated to form a complete courtyard plan. Through a built-in sharing function of the application, merchants can be contacted and area information can be shared. The merchants may provide quotations of a construction job in the courtyard, such as laying grass and/or other plants on landscape areas 5-10. When the user and a merchant reaches an agreement, the transaction can be completed online through third-party payment plug-in or application (e.g., also provided by the trajectory processing apparatus).

Specifically, the implementation steps may include the following.

1. Turn on the ranging wheel, establish connection between the ranging wheel to a terminal device (e.g., trajectory processing apparatus). In a graphical user interface, as the ranging wheel is pushed along a contour of a space, a trajectory diagram of the space of the space can be determined. An area of the space can also be determined. When the venue/site involves multiple spaces or when there are walls, multiple trajectories can be established in the same interface to form multiple spaces.

2. In the graphical user interface, manually translate and rotate each space to a suitable position. Different colors or textures may be assigned to each space. Two spaces with the same color or texture can be merged into one space when they are adjacent to each other in the interface.

3. After the position adjustment and space merging is completed, a complete courtyard plan is formed. Areas of all spaces can be automatically calculated based on their respective trajectory diagrams and/or areas of neighboring/relevant spaces (e.g., using the disclosed trajectory processing procedure for calculating an area of a target space). The calculated area values may also be displayed in the GUI.

4. Different materials and service providers can be selected for each space. The terminal device and/or a background server can automatically calculate the quantity and price of materials required, as well as labor costs, based on information provided by the service provider and the area of the space. The information may include, for example, material loss rate, construction speed of construction materials, which are filled in by the service provider when they register with the background server. Accordingly, a total construction quotation is generated.

5. After the user submits the order, a service provider can evaluate the feasibility of the construction operation according to the courtyard plan. After the review is passed, the order contract is automatically generated by the background server.

6. After the user completes a payment, the service provider can come to the physical site to carry out the construction.

In some embodiments, attribute information of a first space may include height information of the first space, the first space being one of the multiple spaces or the target space. The height information may be a height or a depth of the first space. The procedure S300 may further include: determining, according to one or more first trajectory diagrams corresponding to the first space and the height information of the first space, a volume of the first space; and adding the volume of the first space into the attribute information of the first space. The height information may include one or more heights corresponding to the first space. In one example, the volume may be a product of an area and a height of the first space. In another example, when a shape of the first space is irregular, the volume may be an integration of multiple products of an area and a corresponding height in the first space. In this way, in addition to area calculations, volume calculations can be achieved by combining height data, which is especially important for volumetric construction projects such as digging a swimming pool or stacking flower beds.

It can be understood that volume calculation can be implemented as an embodiment but may not be necessary. Area calculation can be performed alone or in combination with volume calculation based on practical applications.

Using FIG. 4A as an example, a construction plan (e.g., specified by a user on the GUI or transmitted/loaded in the trajectory processing apparatus) may include: paving cement on space S1 with a thickness of H1, laying grass on space S2 with a thickness of H2, laying synthetic rubber on space S3 with a thickness of H3, and laying a flower bed with a height of H4. In one operation, a ranging device can be used to respectively track trajectories of spaces S, S2, S3 and S4 and form independently closed regions for said spaces. In a display interface of the application program, the regions can be dragged and adjusted to determine relative positions. Accordingly, areas of the spaces can be calculated. The height data of each space can also be input into the application program, and the volume of each space can be calculated. Further, the application program may have a built-in e-commerce platform plug-in, which facilitates selection of specifications (e.g., size, model, color, etc.) of desired material(s) based on area, volume and/or other data of the spaces, thereby achieving one-click ordering. Further, the quantity, cost and estimated construction period can be calculated according to the measured area, volume and other data.

In some embodiments, two of the multiple spaces that are originally not connected may form a continuous region based on user dragging operation. For example, in FIG. 4A, space S2 may be moved to share partial boundary or overlap with space S3, and form a combined continuous graphic together. The area of the continuous region may be determined based on their position relationship.

It can be understood that, in practical construction planning scenarios, Boolean operations (summation, difference, and intersection) between areas or volumes are often involved, and it is difficult to directly calculate the results of Boolean operations in the related art. To solve such problems, the disclosed trajectory processing method can calculate the area/volume of space of interest by moving ranged/measured regions, and Boolean operations can be performed according to the positional relationship between the ranged/measured regions, such as nesting, overlapping, etc. The space of interest does not need to be surveyed by a ranging device, but can be specified based on user selection of a continuous region in a combined graphic (e.g., the combined graphic being formed by adjusting position relationship among ranged spaces). Determination of area/volume of space of interest provides necessary guarantees for subsequent work related to the space of interest, such as cost calculation and material estimation, which is particularly important for construction planning and furnishing. In addition, the disclosed trajectory processing method can achieve a combination of the e-commerce platform and the application program of a ranging wheel, providing variety of choices of construction products and/or services according to the measured area, volume and other data, and achieving functions such as one-click ordering.

Figure 6A:
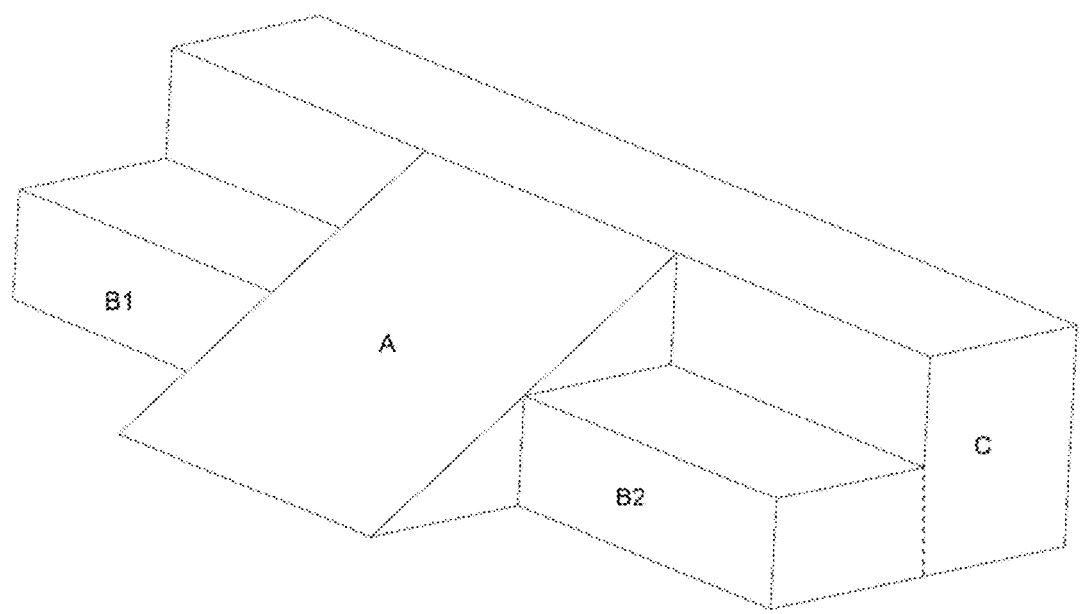
FIG. 6A is a schematic diagram of a perspective view of an example volumetric construction project according to an embodiment of the present disclosure.

In one embodiment, the height data can be obtained from a third party source, such as a drawing formed by a graphical design software. In another embodiment, the height data can be obtained by means of a measuring/ranging tool. In some embodiments, the height data may include height information of a 3D object with a uniform cross-section shape. For example, FIG. 6A shows a perspective view of an example volumetric construction project. As shown in FIG. 6A, the project can be divided into three parts with different height profiles: A, B1 and B2, and C. Volumes of the three parts can be respectively calculated based on their height profiles and corresponding bottom areas. In this way, the total volume of the construction project can be calculated based on the volumes of the three parts. In some other embodiments, the height data the height data may include height information of a 3D object with non-uniform cross-section shape. For example, the 3D object may be a hill. The hill may be a sand pile to be removed/excavated. The height profile of a cross-section of the hill (e.g., hillside profile) can be measured by operating a ranging wheel to track from a starting point on the bottom of the hillside to an ending point of the hillside. In this way, height profiles corresponding to cross-sections of different parts of the hill can be obtained respectively. In this way, the volume of the hill can be calculated based on an integration of the height profiles and shape of the corresponding bottom areas. Alternatively, the volume and/or a surface area of the hill can be calculated by a mesh method based on the trajectory data containing height information. For example, as shown in FIG. 8B, a ranging wheel can be operated to track along the meshes on a hill. Resolution of the mesh can be adjusted based on practical scenarios to achieve desired accuracy in determining the volume. It can be understood that the volume of a target space can be obtained according to data of suitable measurement equipment other than the ranging wheel.

In some embodiments, the properties of a target construction object may also be needed to estimate quantity or volume of the target construction object. For example, a ground of a space may need to be laid with pebble materials, and pebbles have multiple attributes such as size, density, and shape. A user may determine specify a desired property such as density, or obtain the properties of different types of the same material from the e-commerce platform. The cost of the target construction object can be calculated accordingly.

In some embodiments, attribute information of a first space further includes density and height information of multiple first target construction objects to be used at the first space and height information of the first space, each first target construction object having a corresponding height and a corresponding density. The first space can be one of the multiple spaces or the target space. The procedure S300 may further include: determining, according to the density information and the height information, volumes of the multiple first target construction objects; and determining first construction information for the first space according to the volumes of the multiple first target construction objects. In this way, when the heights of construction objects are different, each part can be calculated separately based on different height data, and different volume data can be obtained, so as to make proper preparations for subsequent construction.

Figure 6B:
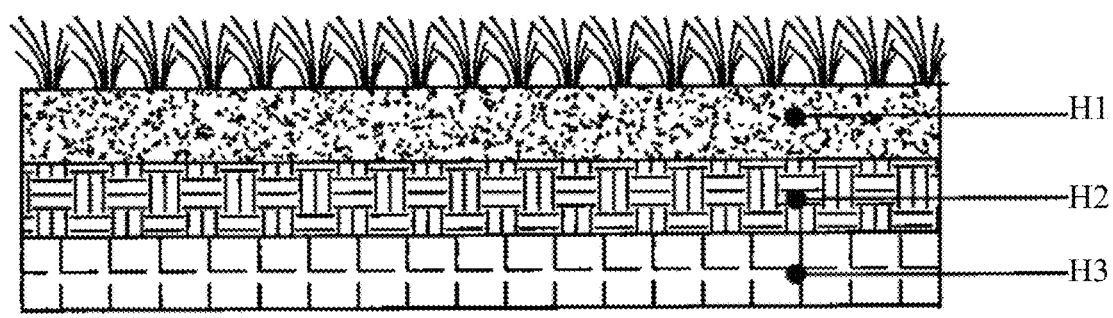
FIG. 6B is a schematic diagram of a cross-section view of an example multi-layer construction project according to an embodiment of the present disclosure.

For example, as shown in FIG. 6B, a one construction project may include multi-layer stacking, such as a brick layer with a thickness of H3 first, followed by a permeable layer with a thickness of H2, a layer of soil and lawn with a thickness of H1 on top. With the disclosed process, the volume of each layer, the quantity of materials and construction-related information can be calculated based on the above-mentioned height/thickness data.

In another example, when laying a same target material on a surface (such as the ground of a floor plan as shown FIG. 4B), different areas may require different thickness, and some areas may be excluded. For example, when applying epoxy resin on the ground, areas such as toilets, weak electric wells, marble at the door, etc. and the pillars (e.g., S4, S8, S2) should be deducted. Further, some heavy work areas (e.g., S1) may need a first thickness of epoxy resin, and light work areas (e.g., S5', S7) may need a second thickness of epoxy resin. The first thickness may be greater than the second thickness. The trajectory processing apparatus may determine the total volume of epoxy resin based on the different thickness specification of different areas on the whole site. Further, a purchase order of the total volume of the epoxy resin can be placed in the application program.

In one embodiment, the process S300 may further include: calculating a quantity of a first target construction object based on the relationship between an area of a first space and a unit area of the first target construction object. For example, when planning to lay floor tiles in the first space, the required quantity can be calculated according to the unit size of one floor tile. Here, those skilled in the art should understand that the quantity is not necessarily directly obtained by division. For example, when the area is not particularly regular, it is also necessary to consider whether it is necessary to cut the floor tiles of the existing size, thus requiring comprehensive use of shape parameters to determine the number of floor tiles required.

FIG. 7A shows a construction project involving two hills that have overlapping volume. FIG. 7B shows projections of the two hills on the ground. As shown in FIG. 7B, a bottom area of first hill can be represented as S=S1+S3, a bottom area of second hill V2 is represented as S'=S2+S3. The intersection volume is denoted as V3. The volume of the first hill is represented by V=V1+V3, the volume of the second hill is represented by V'=V2+V3.

In one example related to FIGS. 7A and 7B, a construction project may include stacking stones to fill volume V1 and V3, stacking soil blocks to fill volume V2, to generate the two hills. The following steps can be executed to implement the construction project. Step 1: Push a distance measuring wheel to walk around the area S, draw a trajectory diagram of the area S, form a closed figure, and obtain the area S of the closed area. Step 2: Push the distance measuring wheel to walk around the area S', draw a trajectory diagram of the area S', form a closed figure, and obtain the area S' of the closed area. Step 3: Calculate the intersection area S3 (e.g., a calculation method of irregular graphics can be used, such as small square method). Step 4: Measure or input multiple heights corresponding to area S, and calculate the volume V of area S (multiple heights of area S can be the same or different). Step 5: Measure or input multiple heights corresponding to the area S', and calculate the volume V' of the area S' (multiple heights of the S' area can be the same or different). Step 6: Calculate the volume V3 of the area S3 by inputting the height corresponding to the S3 of the intersected area. Step 7: Determine that the required volume for stones is V, and the required volume for soil blocks is V'-V3.

Figure 8A:
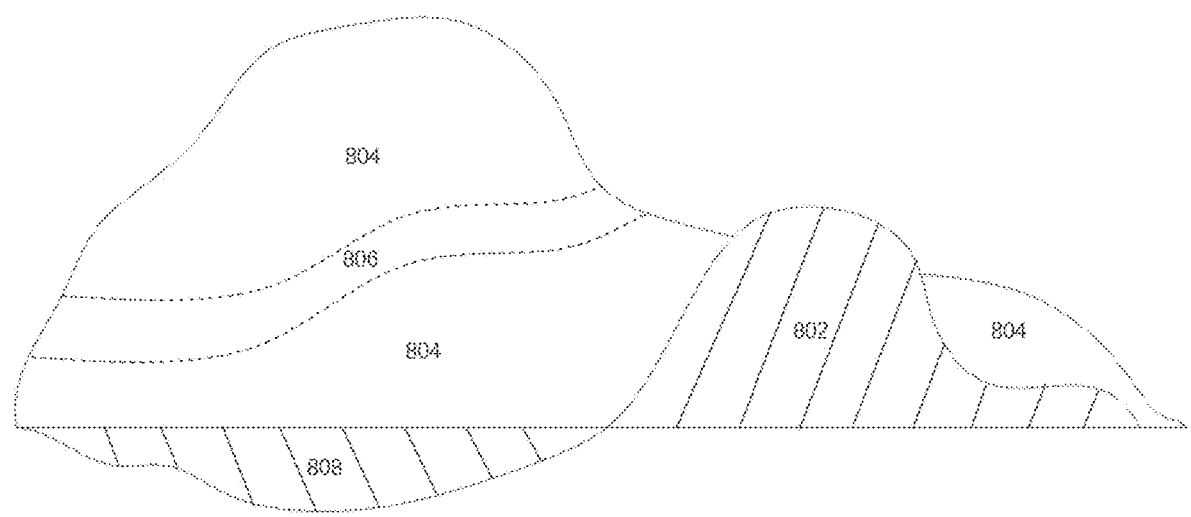
FIG. 8A is a schematic diagram of a perspective view of another example volumetric construction project according to an embodiment of the present disclosure.
Figure 8B:
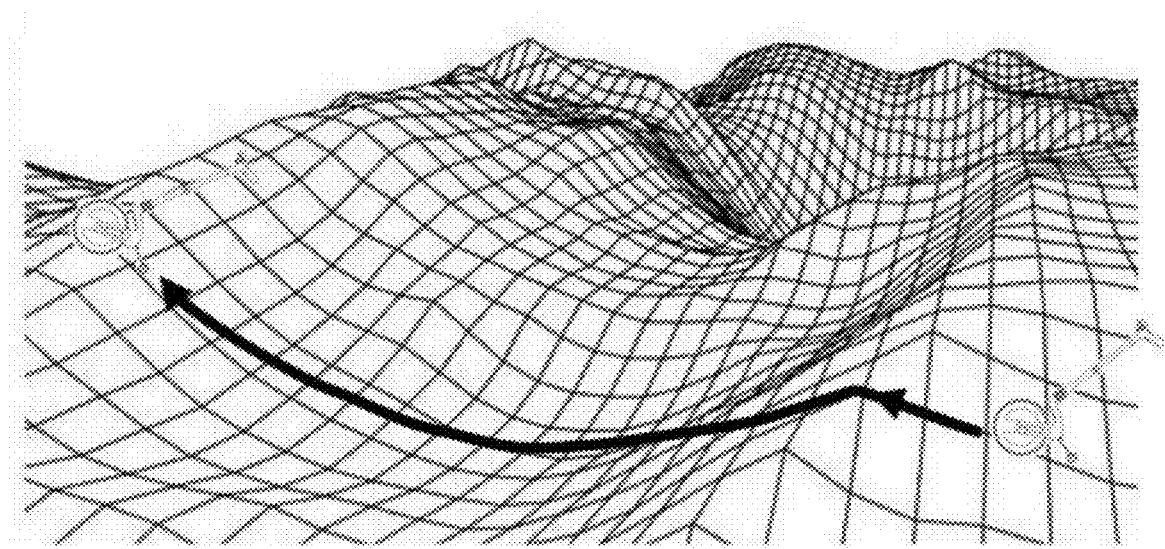
FIG. 8B is a schematic diagram showing trajectory tracking using a ranging wheel according to an embodiment of the present disclosure.

FIG. 8A is a schematic diagram of a perspective view of another example volumetric construction project according to an embodiment of the present disclosure. As shown in FIG. 8A, part 802 indicates a pre-existing hill, part 808 indicates a pre-existing pit, the aim of the project is to build a target hill 804 with a conduit 806. That is, some part of the pre-existing hill 802 should be removed and can be filled to the pit 808, additional materials are needed to fill up the volume of target hill 804 but exclude the volume of the conduit 806. In operation, trajectory data of pre-existing hill 802 and pit 808 can be obtained (e.g., by using a ranging wheel in a similar manner as shown in FIG. 8B). The volume of target hill 804 and conduit 806 can be obtained based on data from a digital blueprint. The volume of required material may be V804−V806−V802+V808.

By using the disclosed trajectory processing method and apparatus, construction planning can not only be based on the surveying and mapping results, but also can be combined with the user's selection of the relative positions of at least two spaces, which can be implement different combinations of measured spaces. Further, the area of at least one continuous region in a combined graphic can be calculated for a new design. That is to say, the construction planning is not limited to the drawing based on the measurement trajectories, but takes additional factors into account, such as the relative positions, heights, specifications, materials preferred by the user, which provides technical improvements in construction planning.

The method and apparatus provided by the present disclosure according to the embodiments are described in detail above. The principles and implementation manners provided by the present disclosure are described herein by using specific examples. The description of the above embodiments is only used to help understand the method provided by the present disclosure. At the same time, a person skilled in the art will make changes the specific embodiments and the application scope according to the idea provided by the present disclosure. In summary, the contents of the present specification should not be construed as limiting the present disclosure.

What is claimed is:

1. A method for trajectory processing, comprising:
generating a trajectory diagram of a real space by using sensor data of a ranging device, the sensor data including angle information and distance information obtained by the ranging device when the ranging device travels at the real space;
displaying, on a graphical user interface, a plurality of trajectory diagrams of multiple spaces, wherein each space corresponds to at least one of the trajectory diagrams, and the plurality of trajectory diagrams includes the generated trajectory diagram of the real space;

determining a target space on the graphical user interface, wherein a perimeter of the target space being formed by boundaries of two or more spaces of the multiple spaces;

determining attribute information of the two or more spaces, wherein the attribute information of a space includes at least an area of the space calculated based on one or more of the trajectory diagrams that correspond to the space;

determining an area of the target space based on the areas of the two or more spaces;

assigning a same type of construction object to at least two spaces, comprising:
  identifying the at least two spaces based on a user selection operation on the graphical user interface;
  displaying, on the same graphical user interface that presents the plurality of trajectory diagrams of the multiple spaces, icons of candidate construction objects;
  displaying, based on a target icon selected by a user among the icons of the candidate construction objects, that the at least two spaces correspond to a target construction object indicated by the target icon; and
  in response to the target icon being selected, displaying, on the same graphical user interface that presents the plurality of trajectories diagrams of the multiple spaces, a plurality of candidate vendors, and information about specification and price of the target construction object under each candidate vendor; and displaying total construction information for the at least two spaces based on the area of each of the at least two spaces and target construction object information of the same target construction object.

2. The method according to claim 1, wherein the attribute information of a space further comprises target construction object information of the space, and the method further comprises:
  determining, according to the attribute information of the two or more spaces, target construction information for the target space.

3. The method according to claim 1, further comprising:
  determining, for each space of at least two spaces, attribute information of the space, wherein the attribute information of a space includes at least an area of the space and target construction object information of the space; and
  determining, according to the attribute information of the at least two spaces, construction information for the at least two spaces.

4. The method according to claim 1, further comprising:
  in response to determining that a default utility of the at least two spaces is the same, determining that the at least two spaces belong to the same type; or
  in response to detecting a first user operation that identifies the at least two spaces with a same label on the graphical user interface, determining that the at least two spaces belong to the same type.

5. The method according to claim 1, wherein the total construction information includes at least one of: a total quantity or a total volume of the target construction object for the at least two spaces, a total cost of the target construction object for the at least two spaces, or a total service period of the target construction object for the at least two spaces.

6. The method according to claim 1, wherein attribute information of a first space further includes height information of the first space, the first space being one of the multiple spaces or the target space, and the method further comprises:
  determining, according to one or more first trajectory diagrams corresponding to the first space and the height information of the first space, a volume of the first space; and
  adding the volume of the first space into the attribute information of the first space.

7. The method according to claim 1, wherein attribute information of a first space includes thickness information of a construction object to be applied at the first space, attribute information of a second space includes thickness information of the same construction object to be applied at the second space, the first space and the second space being one of the multiple spaces or the target space, and the method further comprises:
  determining a total volume of the construction object based on the thickness information and the area respectively corresponding to the first space and the second space,
  wherein the thickness information of the construction object for the first space and the second space is different.

8. The method according to claim 1, wherein determining the target space on the graphical user interface comprises:
  identifying one or more candidate spaces on the graphical user interface, a perimeter of each candidate being formed by boundaries of two or more of the multiple spaces; and
  determining one of the one or more candidate spaces as the target space.

9. The method according to claim 8, the one or more candidate spaces include at least one of: a sub-space of one of the multiple spaces that does not overlap with another space of the multiple spaces, or a space including a portion that overlaps with one of the multiple spaces.

10. The method according to claim 1, wherein:
  attribute information of a first space further includes density and height information of multiple first target construction objects to be used at the first space and height information of the first space, each first target construction object having a corresponding height and a corresponding density, the first space being one of the multiple spaces or the target space; and
  the method further comprises:
    determining, according to the density information and the height information, volumes of the multiple first target construction objects; and
    determining first construction information for the first space according to the volumes of the multiple first target construction objects.

11. The method according to claim 10, wherein the multiple first target construction objects are multiple layers of objects stacked at the first space.

12. The method according to claim 1, wherein the target construction object information of a space includes information about the target construction object to be used at the space, and the target construction object is a product and/or a service to be applied in the space.

13. The method according to claim 12, wherein the target construction object information include at least one of: brand, price, specification, inventory, or hyperlink information associated with the target construction object.

14. The method according to claim 13, further comprising:
generating an online order for the target construction object according to the target construction object information, the price, and the hyperlink information associated with the target construction object.

15. The method according to claim 1, further comprising:
determining positional relationships among the multiple spaces; and
simultaneously displaying the plurality of trajectory diagrams of the multiple spaces according to the positional relationships among the multiple spaces.

16. The method according to claim 15, wherein the positional relationships among the multiple spaces are determined based on geographical coordinates of the trajectory diagrams.

17. The method according to claim 15, further comprising:
moving a first trajectory diagram of the trajectory diagrams on the graphical user interface based on a user movement operation on the first trajectory diagram; and
updating a positional relationship between a space corresponding to the first trajectory diagram and a remaining space based on the user movement operation.

18. An apparatus for trajectory processing, comprising: at least one memory and at least one processor coupled to the at least one memory, the at least one processor being configured to execute a computer program stored in the at least one memory and perform:
generating a trajectory diagram of a real space by using sensor data of a ranging device, the sensor data including angle information and distance information obtained by the ranging device when the ranging device travels at the real space;
displaying, on a graphical user interface, a plurality of trajectory diagrams of multiple spaces, wherein each space corresponds to at least one of the trajectory diagrams, and the plurality of trajectory diagrams includes the generated trajectory diagram of the real space;
determining a target space on the graphical user interface, wherein a perimeter of the target space being formed by boundaries of two or more spaces of the multiple spaces;
determining attribute information of the two or more spaces, wherein the attribute information of a space includes at least an area of the space calculated based on one or more of the trajectory diagrams that correspond to the space;
determining an area of the target space based on the areas of the two or more spaces;
assigning a same type of construction object to at least two spaces, comprising:
identifying the at least two spaces based on a user selection operation on the graphical user interface;
displaying, on the same graphical user interface that presents the plurality of trajectory diagrams of the multiple spaces, icons of candidate construction objects;
displaying, based on a target icon selected by a user among the icons of the candidate construction objects, that the at least two spaces correspond to a target construction object indicated by the target icon; and
in response to the target icon being selected, displaying, on the same graphical user interface that presents the plurality of trajectories diagrams of the multiple spaces, a plurality of candidate vendors, and information about specification and price of the target construction object under each candidate vendor; and
displaying total construction information for the at least two spaces based on the area of each of the at least two spaces and target construction object information of the same target construction object.

19. The apparatus according to claim 18, wherein the at least one processor is further configured to perform:
determining positional relationships among the multiple spaces; and
simultaneously displaying the plurality of trajectory diagrams of the multiple spaces according to the positional relationships among the multiple spaces.

* * * * *